United States Patent [19]

Liu

[11] Patent Number: 5,429,481
[45] Date of Patent: Jul. 4, 1995

[54] ANGLE-ADJUSTABLE JOINT FOR ELECTRIC FANS

[76] Inventor: Su-Liang Liu, 6-1F., No. 102, Sec. 5, Nan King E. Rd., Taipei, Taiwan

[21] Appl. No.: 294,031

[22] Filed: Aug. 24, 1994

[51] Int. Cl.⁶ .......................................... F04D 29/60
[52] U.S. Cl. ............................... 416/246; 416/247 R; 403/93; 403/97
[58] Field of Search .................. 416/246, 247 R, 244, 416/100; 415/126, 213.1, 214.1; 403/92, 93, 94, 97; 248/130, 284, 291

[56] References Cited

U.S. PATENT DOCUMENTS 1,324,895 12/1919 Hertz et al. ......................... 403/97
5,062,179 11/1991 Huang ............................... 403/93

FOREIGN PATENT DOCUMENTS 0191697 8/1987 Japan ................................ 416/246

Primary Examiner—Edward K. Look
Assistant Examiner—Christopher Verdier
Attorney, Agent, or Firm—Varndell Legal Group

[57] ABSTRACT

An angle-adjustable joint including an upright stand having a substantially U-shaped mounting frame at the top, a fan support pivotally connected to the U-shaped mounting frame by a screw bolt and a nut, and a lock retained in a vertical groove on the U-shaped mounting frame and engaged with a tooth portion in an annular recess at one side of the fan support to lock the fan support in any of a series of angular positions, wherein the lock has a hooked portion on a projecting rod thereof inserted through a transeverse through hole on the fan support and hooked on a retaining flange at an opposite side of the fan support.

1 Claim, 3 Drawing Sheets

ANGLE-ADJUSTABLE JOINT FOR ELECTRIC FANS

BACKGROUND AND SUMMARY OF THE INVENTION

The present invention relates to an angle-adjustable joint for electric fans, and relates more particularly to such and angle-adjustable joint which is detachable and can be conveniently assembled without any special techniques.

A regular desk or floor fan is generally comprised of a fan unit, an upright stand, a fan support having one end fixedly connected to the fan unit at the bottom and an opposite end pivotally connected to the upright stand at the top, and a lock controlled to lock the fan support in any of a series of angular positions. This structure of fan must be packed in the well-assembled condition when it is made, or the parts thereof may be lost easily. Therefore, this structure of fan needs much storage space during its delivery.

The present invention has been accomplished to provide an angle-adjustable joint for electric fans which eliminates the aforesaid problem. According to he present invention, the lock is made having a hooked projecting rod; the fan support is made having a transverse through hole through the width and a retaining flange at one side. By inserting the hooked projecting rod of the lock into the transverse through hole on the fan support and then hooking the hooked end of the hooked projecting rod on the retaining flange of the fan support, the lock is attached to the fan support. Therefore, the fan support and the upright stand can be detached from each other to minimize the storage space during the delivery of the electric fan.

DETAILED DESCRIPTION OF THE PREFERRED EMBODIMENT

Figure 1:
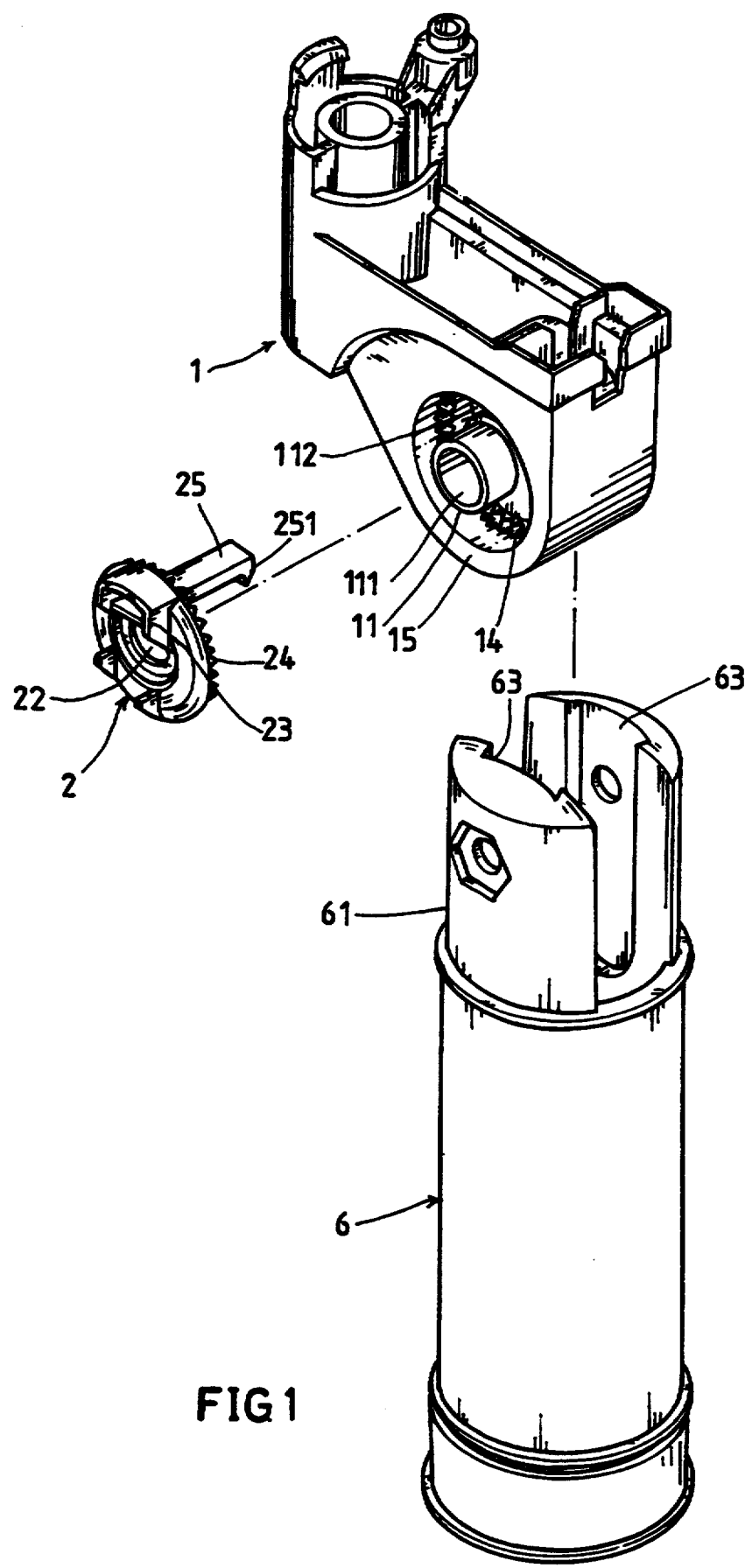
FIG. 1 is an exploded view of an angle-adjustable joint according to the present invention.

Referring to FIG. 1, an angle-adjustable joint in accordance with the present invention is generally comprised of a fan support 1, an upright stand 6, and a lock 2.

Figure 4:
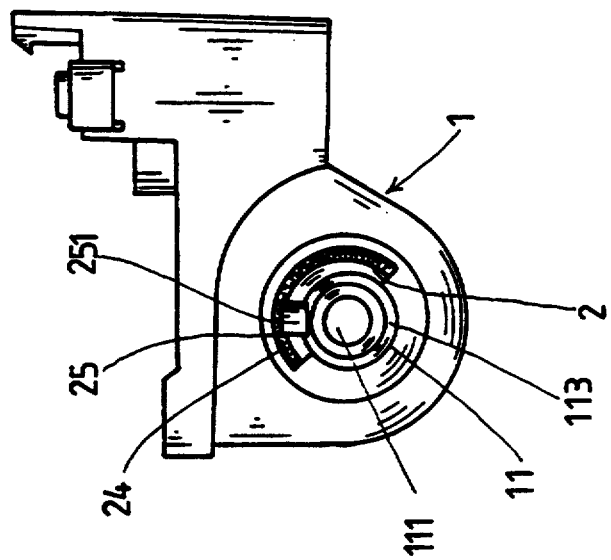
FIG. 4 shows the engagement of the hooked portion of the lock with the retaining flange of the axle housing of the fan support.
Figure 2:
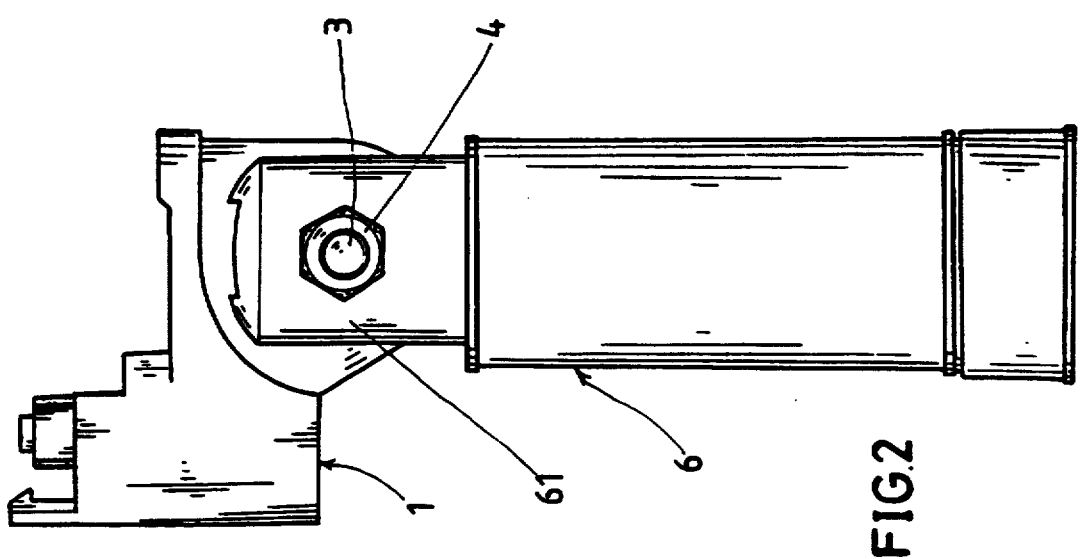
FIG. 2 is a side view of the angle-adjustable joint when assembled.
Figure 3:
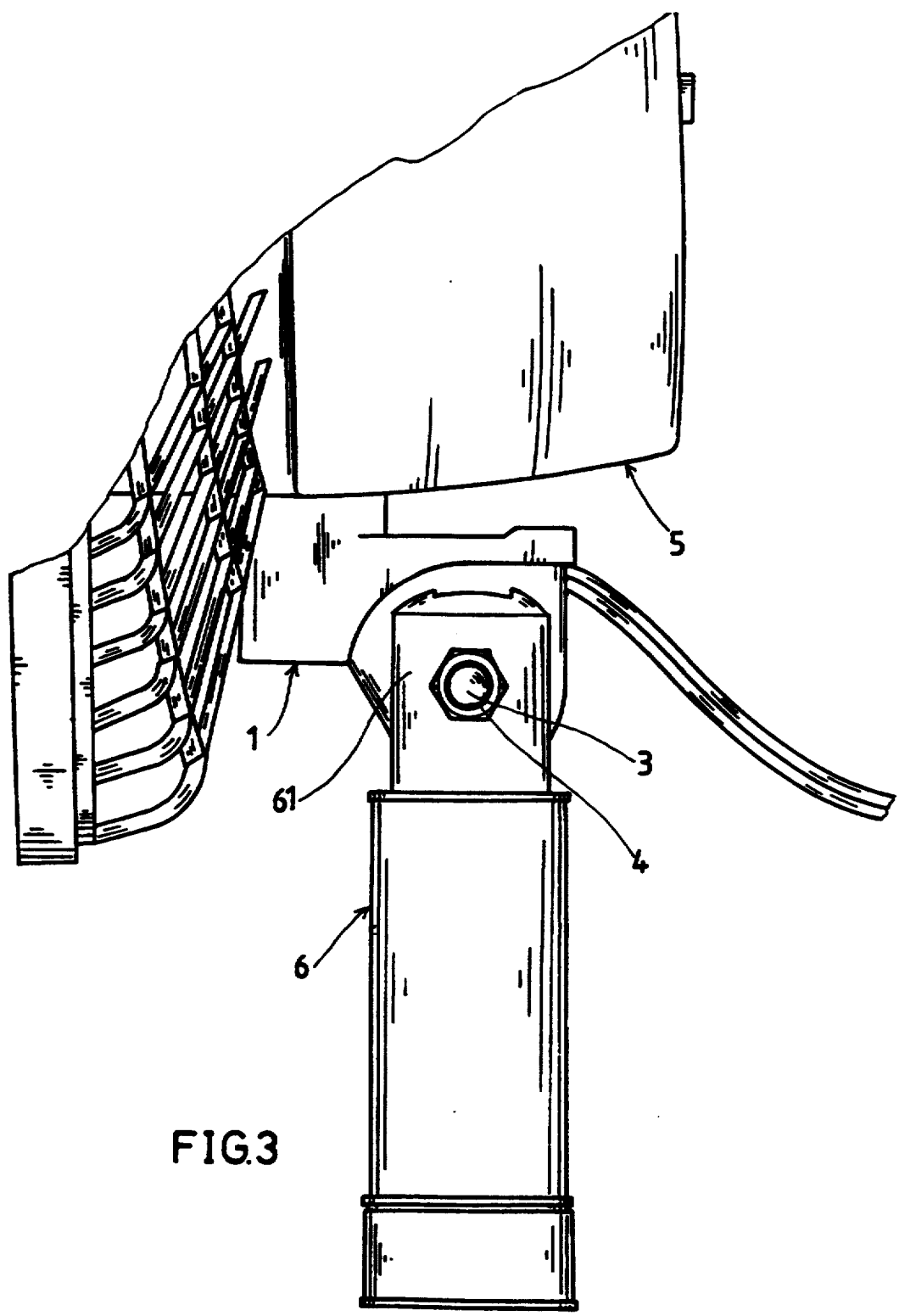
FIG. 3 is an installed view showing the angle-adjustable joint fastened to the motor housing.

Referring to FIGS. 2, 3 and 4 and FIG. 1 again, the fan support 1 is fixedly fastened to the tot housing 5 of an electric fan at the bottom (see FIG. 3), having an axle housing 11 transversely disposed at the bottom end thereof and pivotally connected to a substantially U-shaped mounting frame 61 at the top of the upright stand 6 by a screw bolt 3 and a nut 4. The U-shaped mounting frame 61 comprises two vertical grooves 63 on two opposite inside walls thereof. The axle housing 11 of the fan support 1 is transversely connected between the vertical grooves 63 by the screw bolt 3 and the nut 4. The axle housing 11 defines an axle hole 111 for inserting a screw bolt 3. A toothed portion 14 is made within a circular recess 15 on one side of the fan support 1 around the axle housing 11. The lock 2 is mounted within the circular recess 15, having a center through hole 22, which receives one end of the axle housing 11, an outer locating block 23 extended out of the circular recess 15 and stopped in one vertical groove 63 of the U-shaped mounting frame 61, and a toothed portion 24 disposed at an inner side around the center through hole 22 and meshed with the toothed portion 14 of the fan support When the nut 4 is loosened from the screw bolt 3, the toothed portions 14 and 24 can be disengaged from each other for permitting the fan support 1 to be turned on the screw bolt 3 to change its angle relative to the U-shaped mounting frame 61. When set, the toothed portions 14 and 24 are engaged with each other again, and then the nut 4 and the screw bolt 3 are fastened tight again.

Referring FIGS. 1 and 4 again, the fan support 1 further comprises a transverse through hole 112 spaced bet ween the toothed portion 14 and the axle housing 11, and a retaining flange 113 at one end of the axle housing 11 opposite to the lock 2. The lock 2 further comprises a projecting rod 25 inserted into the transverse through hole 112. The projecting rod 25 terminates in a hooked portion 251 hooked on the retaining flange 113. Because the hooked portion 251 of the projecting rod 25 is hooked on the retaining flange 113 of the axle housing 11, the lock 2 does not disconnect from the fan support 1 when assembled. The fan support 1 can be detached from the upright stand 6 and packed with the lock 2 to minimize storage space during transportation.

I claim:

1. An angle-adjustable joint of the type comprising an upright stand having a substantially U-shaped mounting frame at the top, said U-shaped mounting comprising two opposite vertical walls, two through holes aligned on said vertical walls, and two vertical grooves respectively made on said vertical walls at an inner side through the length; a fan support for supporting an electric fan on said upright stand, said fan support having an axle housing at the bottom pivotally connected between the through holes on said upright stand by a screw bolt and a nut, an annular recess at one side around said axle housing, a toothed portion within said annular recess; a lock mounted around said axle housing and received within said annular recess for locking said fan support in position, said lock comprising a toothed portion releasably engaged with the toothed portion on said fan support, and a locking block extended out of said annular recess and retained in one vertical groove of said upright mounting frame of said upright stand to stop said lock and said fan support from rotary motion relative to said upright stand;

wherein said fan support comprises a transverse through hole spaced in parallel between the toothed portion and axle housing of said fan support, and a retaining flange at one end of said axle housing opposite to said lock; said lock comprises a projecting rod having a hooked portion inserted through the transverse through hole on said fan support and hooked on the retaining flange of said axle housing.

* * * * *